United States Patent
Aoki et al.

(10) Patent No.: US 7,224,881 B2
(45) Date of Patent: May 29, 2007

(54) VARIABLE OPTICAL ATTENUATOR

(75) Inventors: Shigenori Aoki, Sunnyvale, CA (US); Kishio Yokouchi, San Jose, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 11/141,880

(22) Filed: May 31, 2005

(65) Prior Publication Data

US 2005/0207721 A1    Sep. 22, 2005

Related U.S. Application Data

(62) Division of application No. 10/330,785, filed on Dec. 26, 2002, now Pat. No. 7,035,524.

(51) Int. Cl.
*G02B 6/00* (2006.01)

(52) U.S. Cl. ......................... 385/140; 385/40
(58) Field of Classification Search ................ 385/140, 385/40
See application file for complete search history.

(56) References Cited

U.S. PATENT DOCUMENTS 5,966,493 A * 10/1999 Wagoner et al. ............ 385/140
6,507,681 B1 * 1/2003 Kowalczyk et al. .......... 385/16
2001/0046363 A1 * 11/2001 Purchase et al. ............ 385/140

* cited by examiner

*Primary Examiner*—Kevin S. Wood
(74) *Attorney, Agent, or Firm*—Sheppard, Mullin, Richter & Hampton LLP

(57) ABSTRACT

An apparatus for attenuating a light signal is disclosed. The apparatus causes optical attenuation in a waveguide, where the waveguide has an input port for receiving a light signal and an output port for output of an attenuated light signal. First, an electric field is generated in at least a portion of the waveguide, such that a first refractive index in that portion of the waveguide is changed to a second refractive index. Next, the light signal in the waveguide is directed from the input port to the output port through the electric field. And lastly, the light signal is attenuated as a function of the electric field. The light signal may be attenuated, for example, by changing the deflection angle, changing the beam collimation width or from emitting part of the light signal from the waveguide before the light signal reaches the output port.

4 Claims, 8 Drawing Sheets

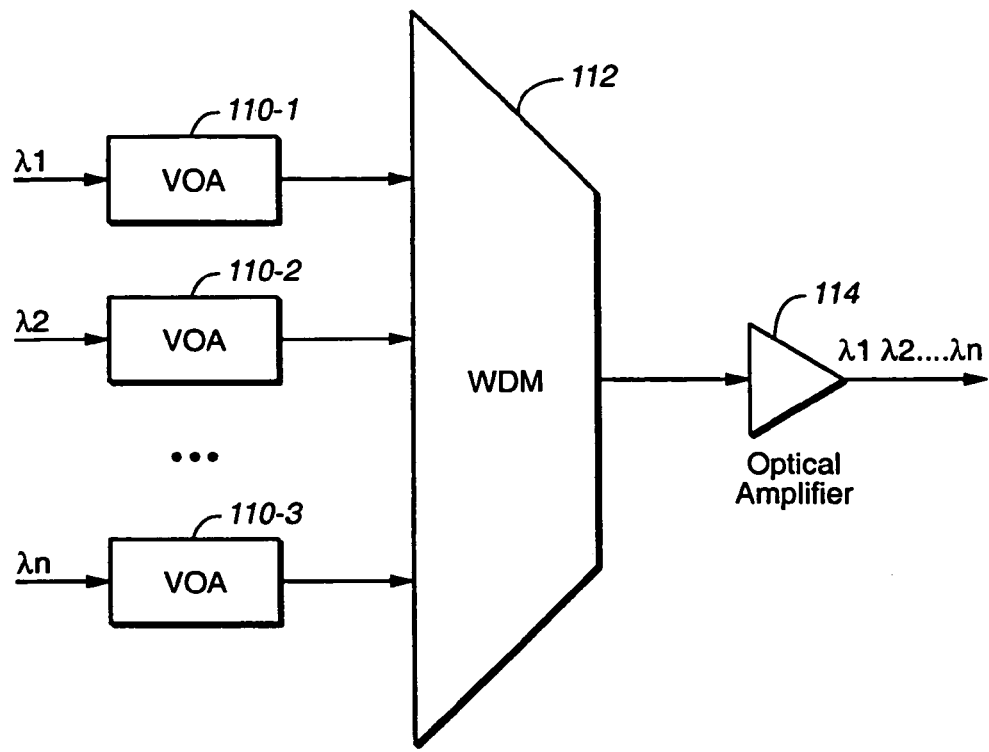
FIG._1
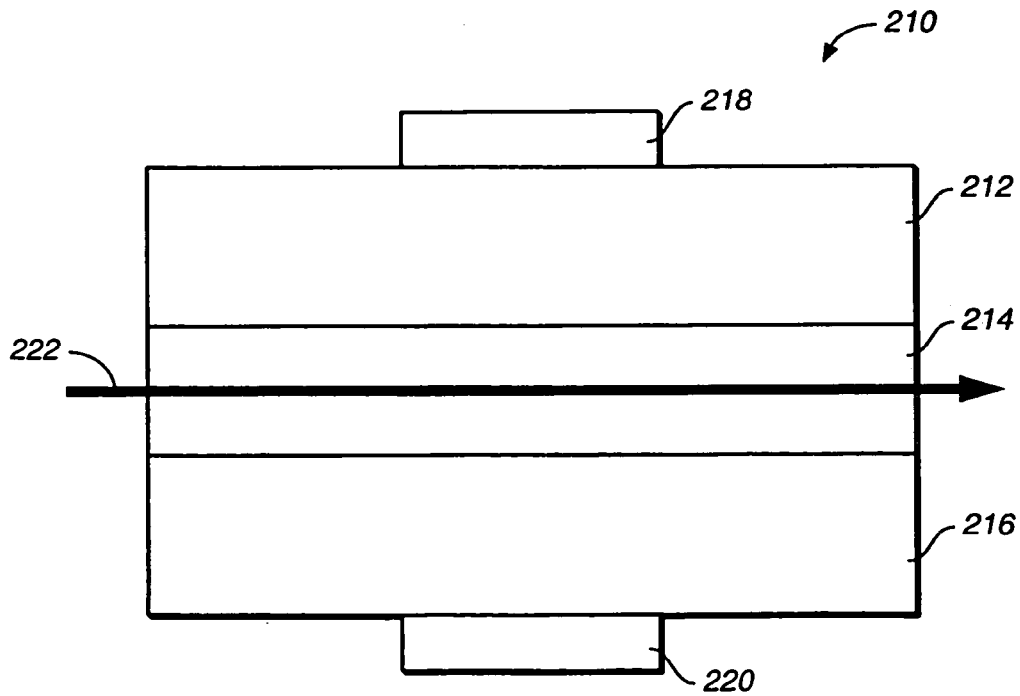
FIG._2

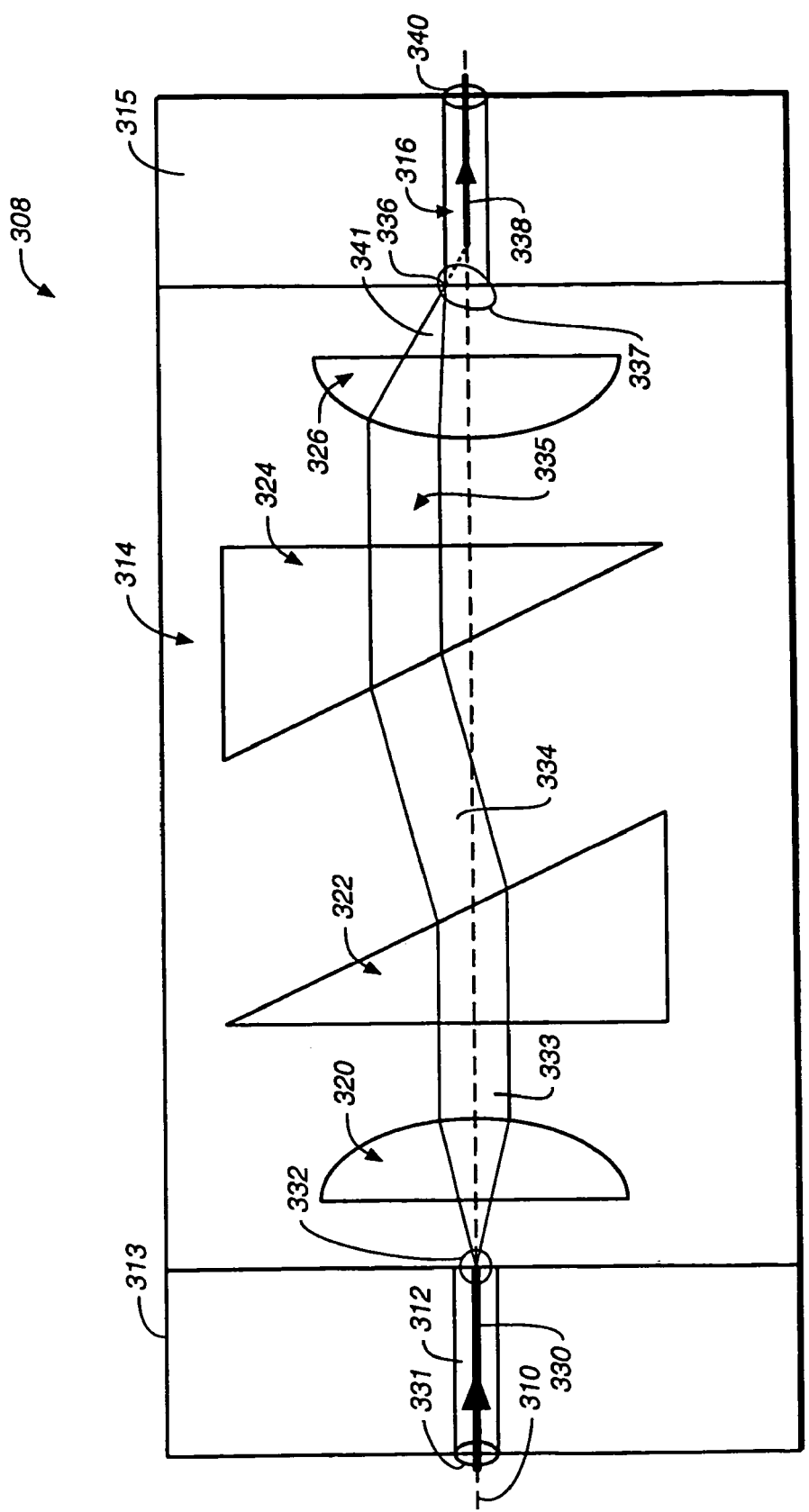
FIG._3

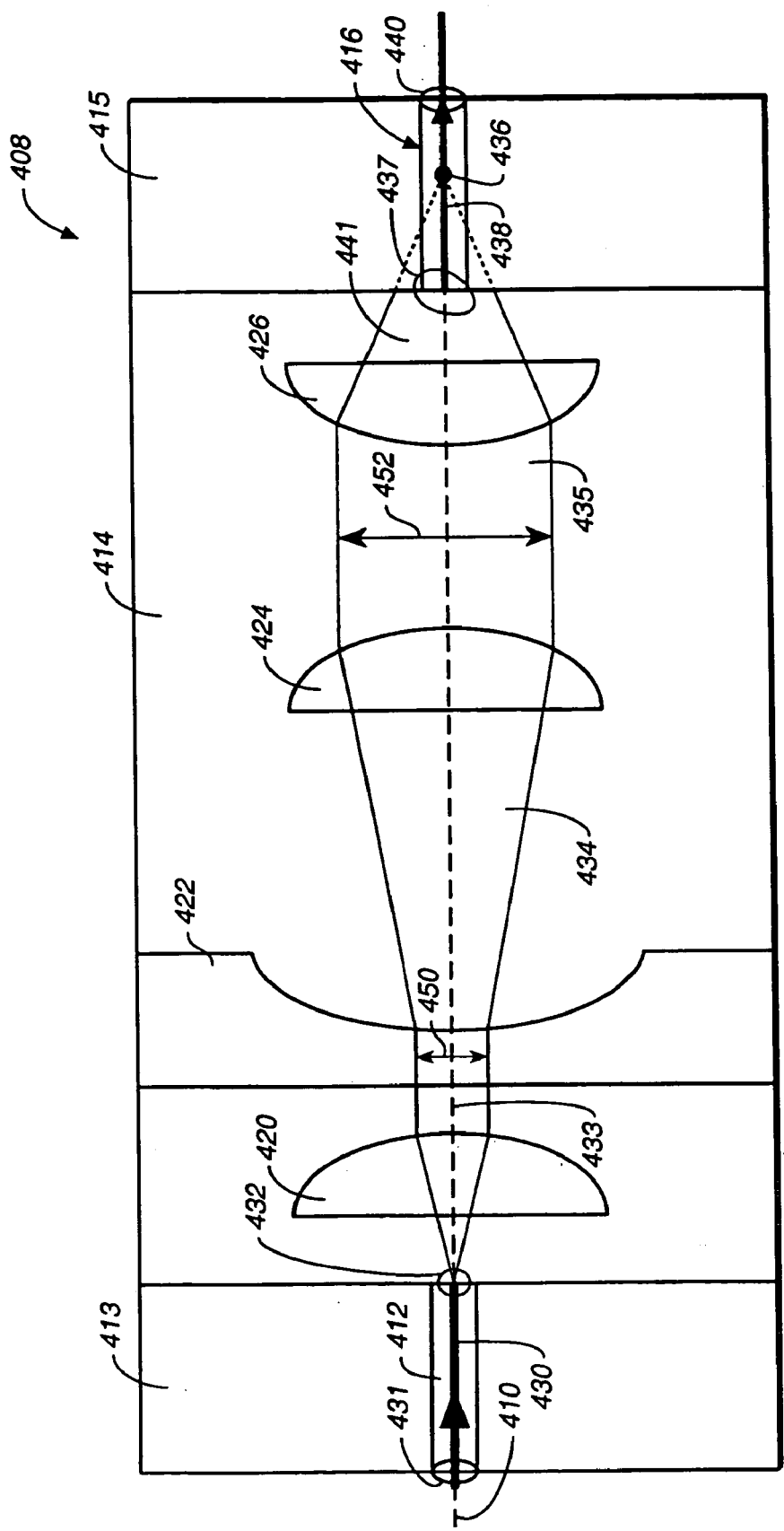
FIG._4

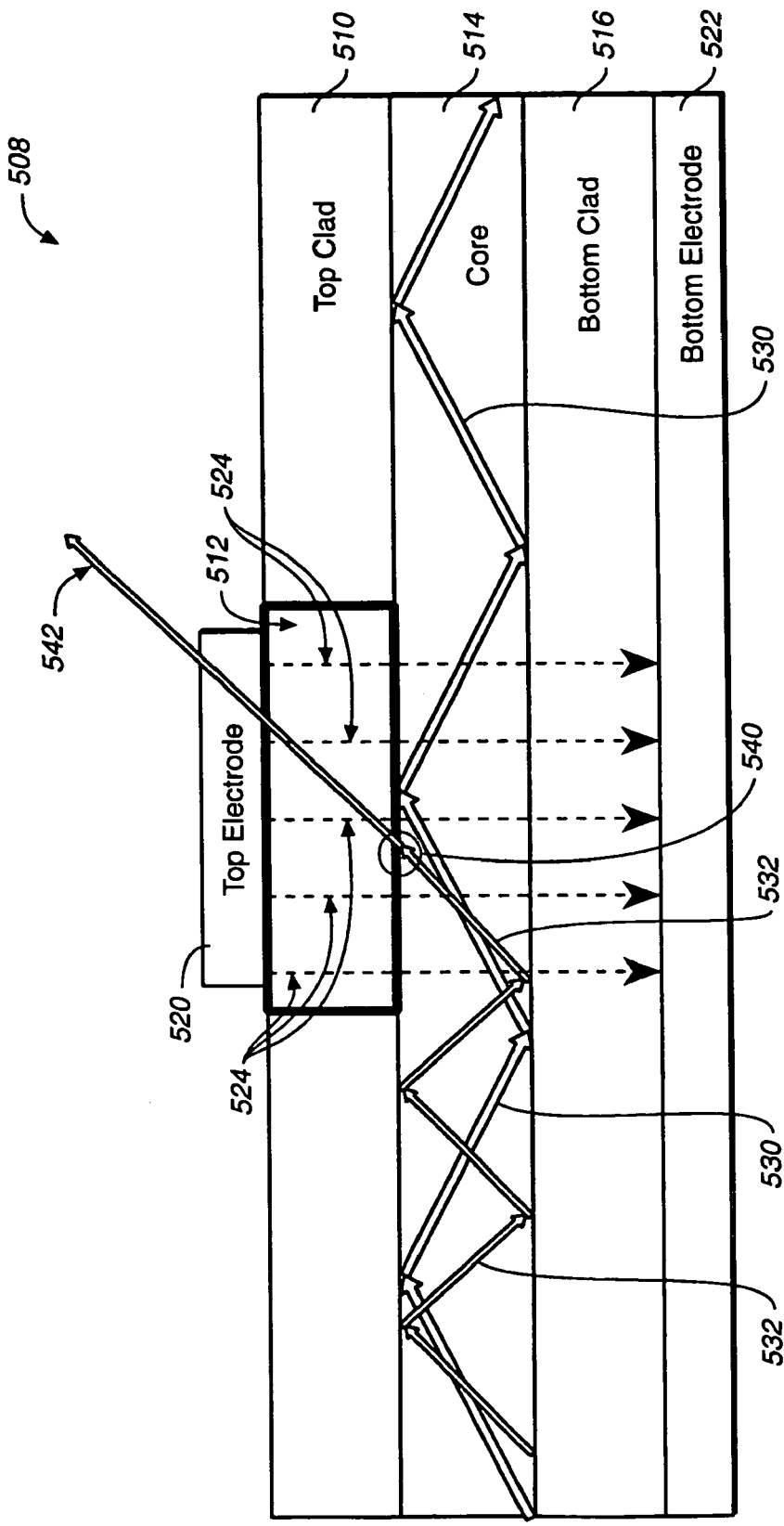
FIG._5

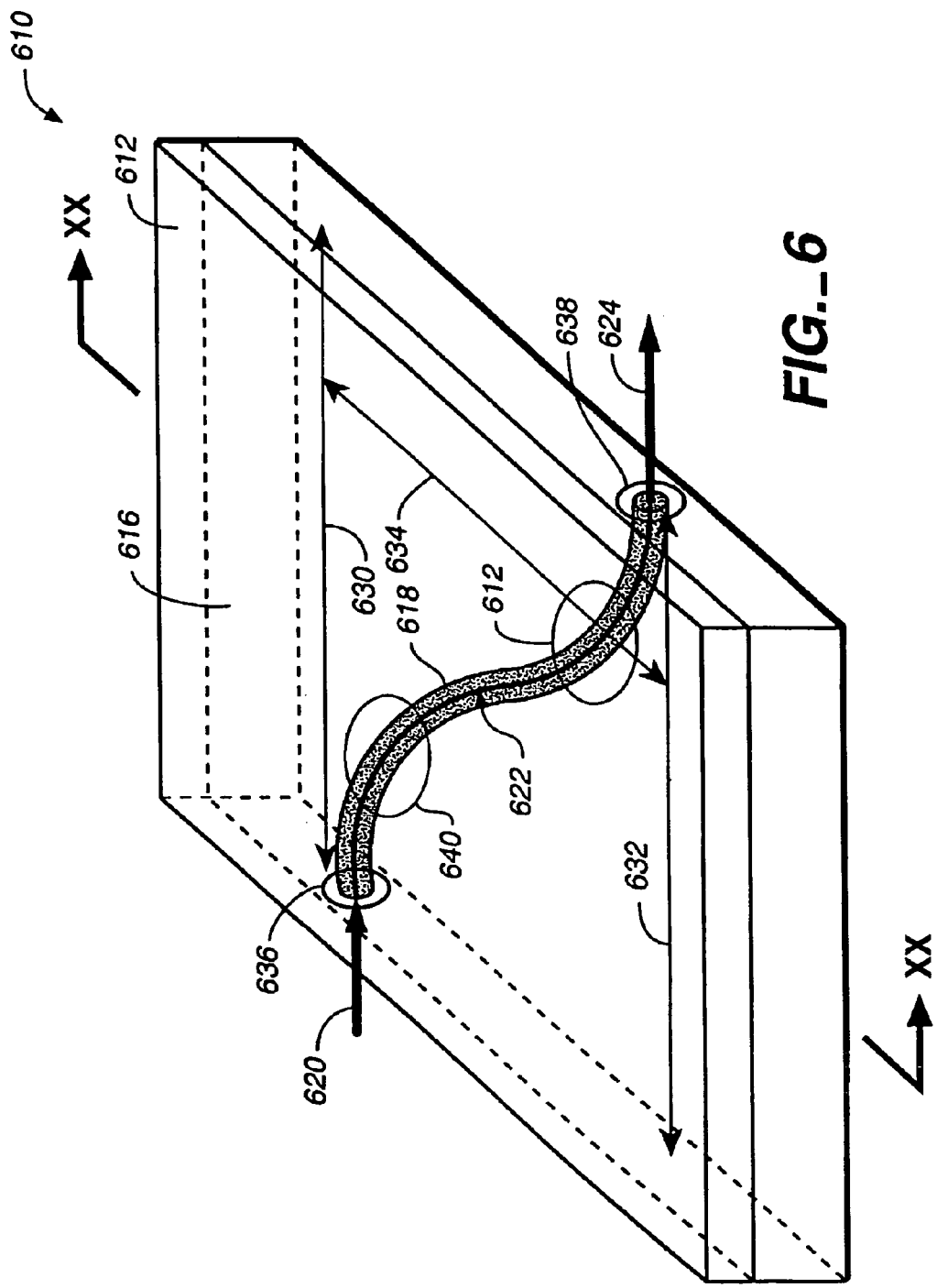
FIG._6

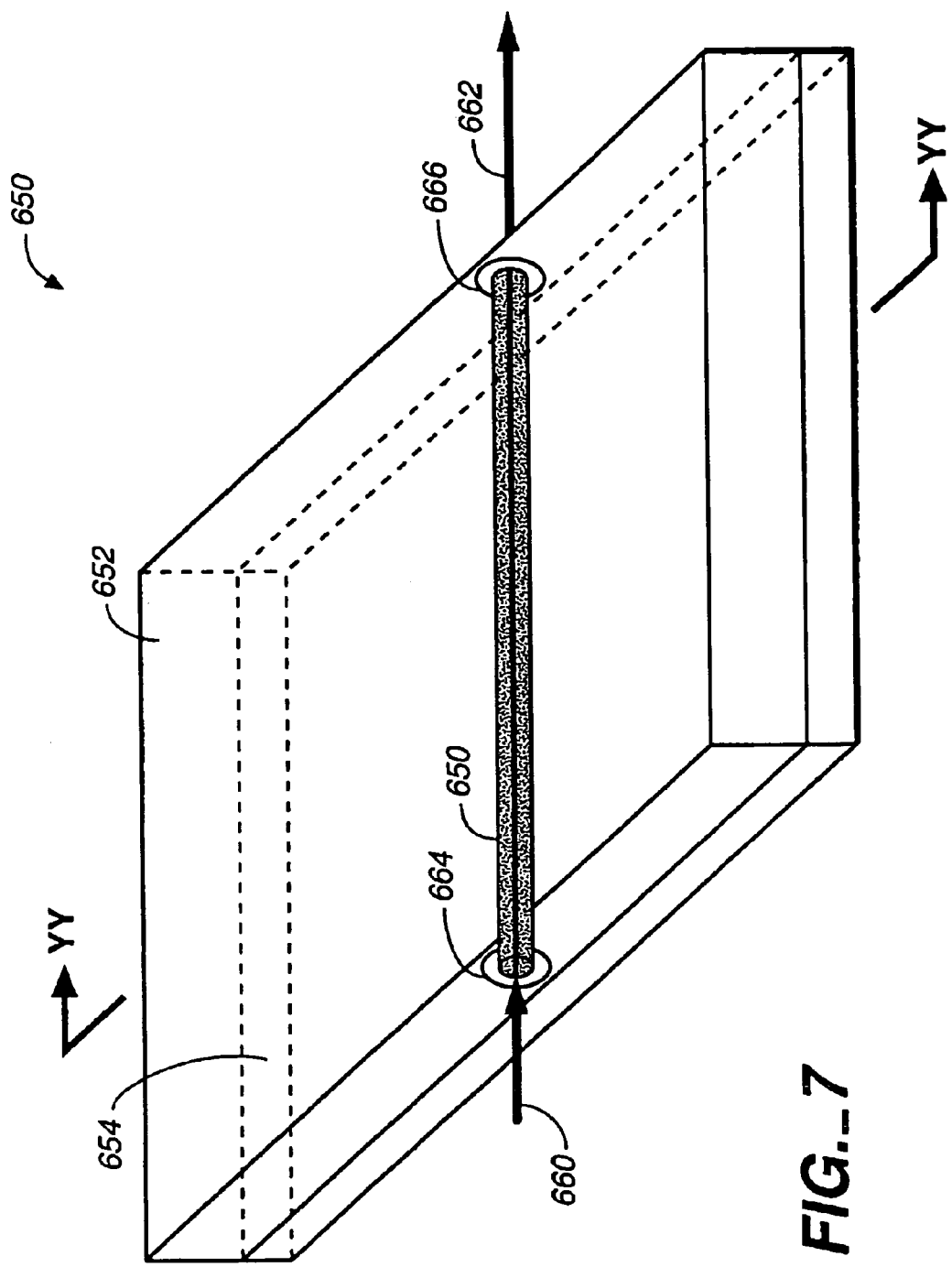
FIG._7

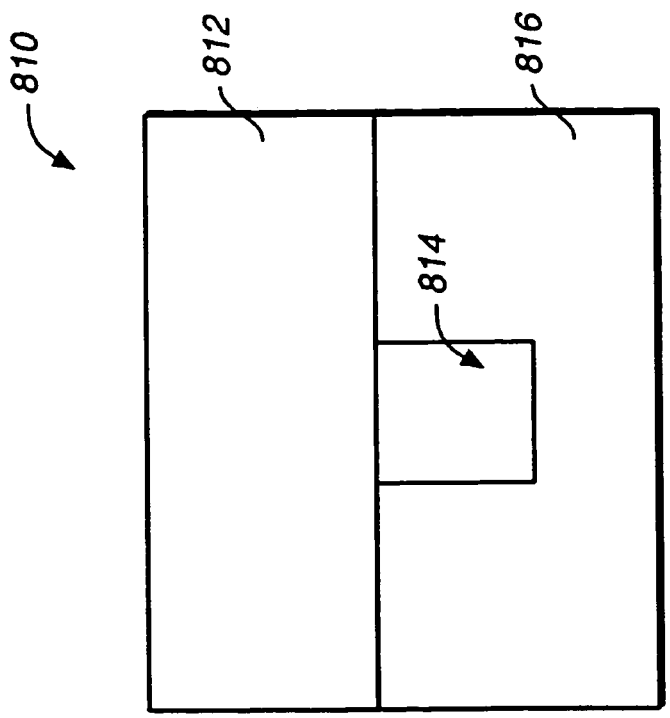
FIG._9
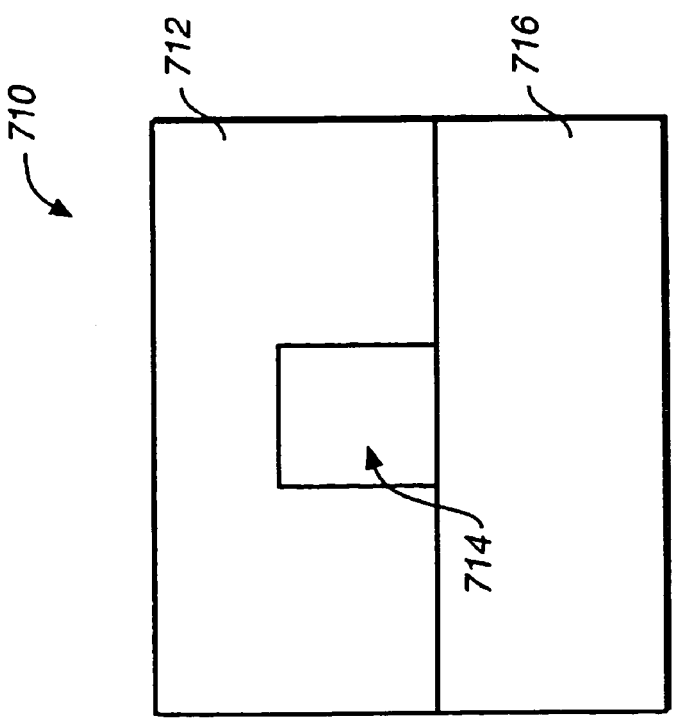
FIG._8

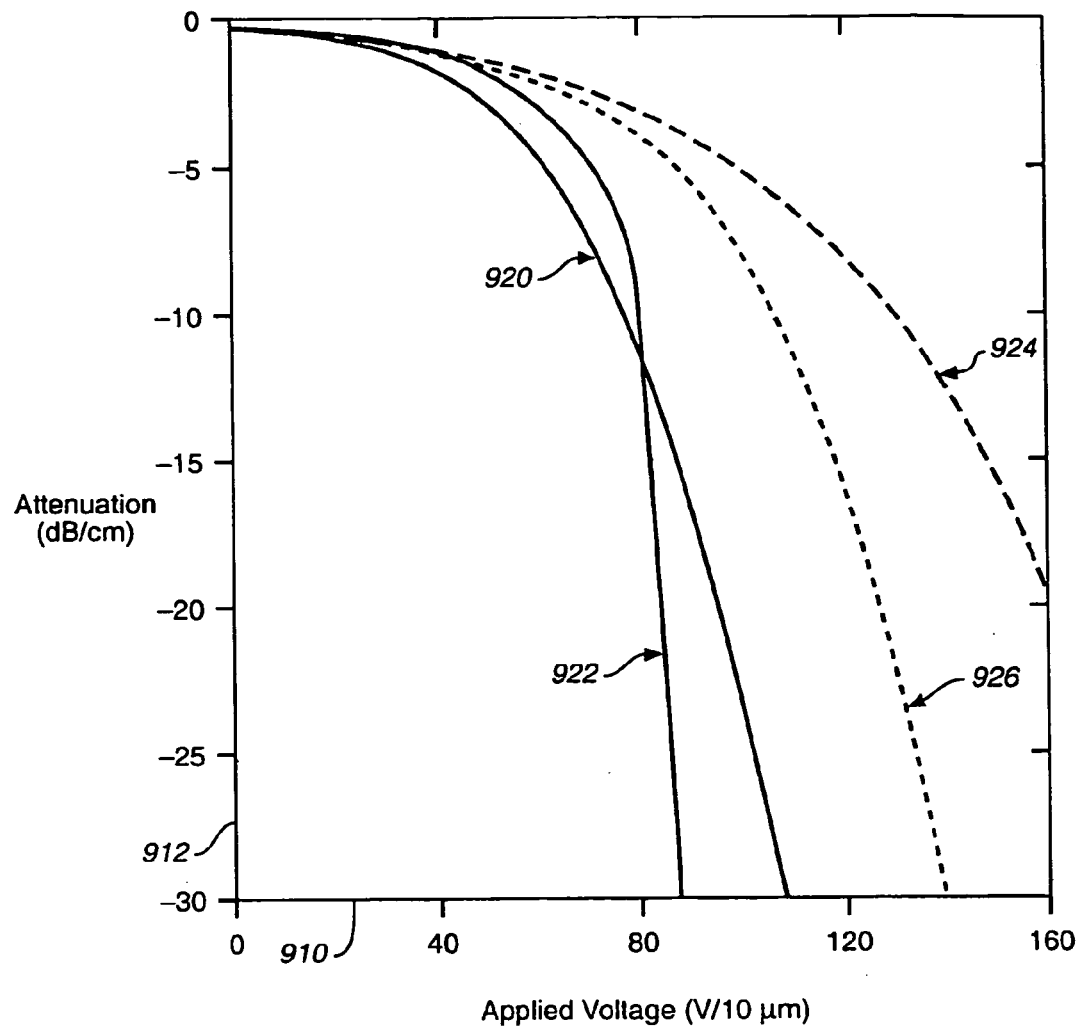
FIG._10

VARIABLE OPTICAL ATTENUATOR

CROSS REFERENCE TO RELATED APPLICATION

This application claims priority as a division of allowed U.S. patent application Ser. No. 10/330,785, filed Dec. 26, 2002 published Jul. 1, 2004, now U.S. Pat. No. 7,035.524. The disclosure of the above parent application is incorporated by reference.

FIELD OF THE INVENTION

The invention relates generally to the field of optical communications networks, and in particular to a variable optical attenuator device.

BACKGROUND OF THE INVENTION

As bandwidth requirements of communication networks continue to rise, wavelength division multiplexing is being used increasingly to aggregate the traffic of many users onto the optical fiber of backbone networks. For example, using a wavelength division multiplexer (WDM), Eighty or more separate wavelengths or channels of data can be multiplexed into a light signal transmitted on a single optical fiber. If each channel carries 2.5 Gbps (billion bits per second), up to 200 billion bits per second can be delivered on the single optical fiber.

However, in wavelength division multiplexing systems, the signal power levels transmitted in an optical fiber depend on the wavelengths. These inter-wavelength discrepancies in optical power levels are caused in part by the use of optical amplifiers, such as erbium-doped fiber amplifiers (EDFAs). The use of EDFAs has revolutionized fiber optics, as they enable WDM data transport over thousands of kilometers. Unfortunately, as EDFAs do not inherently have a flat gain spectrum, there is the problem of uneven gain for different wavelengths. Variable Optical Attenuators (VOAs) provide a solution to this problem by attenuating different wavelengths by different amounts, therefore flattening the gain spectrum.

FIG. 1 is a schematic of an exemplary prior aft application of a variable optical attenuator (VOA). A multiple number of VOAs, e.g., 110-1, 110-2, and 110-3, each receive an input wavelength, e.g., $\lambda 1$, $\lambda 2$, and $\lambda n$, respectively. The VOAs attenuate the power of each input wavelength by different amounts and then transmit the attenuated wavelengths to the WDM 112 to be multiplexed into a multi wavelength light signal. This multi wavelength light signal is the amplified by an EDFA optical amplifier 114 and output to a fiber optic cable for transmission. The attenuation for each VOA has been chosen to compensate for the uneven gain spectrum of the optical amplifier 114.

VOAs in current use include either Mach-Zender interferometers which use a thermo-optic effect to cause variation in attenuation or an electronically controlled mechanical means to cause variation in attenuation. One of the significant disadvantages of these typical VOAs is the speed (i.e., long settling or slow response times). Hence for the fast optical switching networks, which need high speed power adjustments on the order of about one nanosecond (1 GHz), current VOAs are inadequate. Therefore what is needed is a VOA with high speed attenuation adjustment that can support fast optical switching networks.

SUMMARY OF THE INVENTION

The present invention provides techniques, including a system and method, for attenuating a light signal using the electro-optic effect to provide fast attenuation adjustment. One embodiment of the present invention comprises a method for causing optical attenuation in a waveguide, where the waveguide has an input port for receiving a light signal and an output port for output of an attenuated light signal. First, an electric field is generated in at least a portion of the waveguide, such that a refractive index in that portion of the waveguide is changed. Next, the light signal in the waveguide is directed from the input port to the output port through the electric field. And lastly, the light signal is attenuated as a function of the electric field. The light signal may be attenuated, for example, by changing the deflection angle, changing the beam collimation width or from emitting part of the light signal from the waveguide before the light signal reaches the output port.

Another embodiment of the present invention comprises a VOA for attenuating a light signal. The VOA includes: a waveguide, having an input port for receiving the light signal and an output port for output of an attenuated light signal; a first lens for collimating the received light signal; a prism formed by an electric field, where the prism changes a deflection of said collimated light signal depending on the strength of the electric field; and a second lens for focusing the changed light signal on or near the output port, where the attenuation of the light signal is dependent on a location of a focal point of the focused light signal with respect to the output port. The location of the focal point varies as a function of the electric field.

A further embodiment of the present invention comprises a VOA for attenuating a light signal. The VOA includes: a waveguide, having an input port for receiving the light signal and an output port for output of an attenuated light signal; a first lens for collimating the received light signal; a second lens formed by an electric field, where the second lens causes a change in a collimation width of the collimated light signal depending on a strength of the electric field; and a third lens for focusing the changed collimated light signal, where attenuation of the light signal is dependent on the changed collimation width.

An alternative embodiment of the present invention comprises a VOA for attenuating a light signal. The VOA includes: a waveguide, having an input port for receiving said light signal and an output port for output of an attenuated light signal; a first electric field in said waveguide for collimating said received light signal; a second electric field in said waveguide for changing said collimated light signal depending on a strength of said second electric field; and a third electric field in said waveguide for focusing said changed light signal at or near said output port, wherein attenuation of said light signal is dependent on a location of a focal point of said focused light signal with respect to said output port.

Yet another embodiment of the present invention comprises a VOA for attenuating a light signal. The VOA includes: an input port for receiving the light signal; an output port; a waveguide for propagating the light signal from the input port to the output port, and a top electrode on the top clad layer for creating an electric field, where the electric field changes a refractive index of a portion of the top clad layer, such that a part of the light signal is emitted out of the waveguide before the output port. The waveguide includes a core, a top clad layer, and a bottom clad layer, where a part of the top clad layer has an electro-optic material.

One aspect of the present invention comprises a system for attenuating a light signal. The system includes: a waveguide comprising input means for receiving the light signal and an output port; means for generating an electric field in at least a portion of the waveguide such that a first refractive index in the portion of the waveguide changes the refractive index; means for directing the light signal in the waveguide from the input means to the output port through the electric field; and means for attenuating the light signal in the waveguide as a function of the electric field.

These and other embodiments, features, aspects and advantages of the invention will become better understood with regard to the following description, appended claims and accompanying drawings.

BRIEF DESCRIPTION OF THE DRAWINGS

FIG. 1 is a schematic diagram of a know use of a variable optical attenuator (VOA);

FIG. 2 is a cross-section of a portion of a waveguide of an embodiment of the present invention;

FIG. 3 is a top view of a VOA device of an embodiment of the present invention, which varies optical attenuation by changing the optical beam deflection angle;

FIG. 4 is a top view of a VOA device of another embodiment of the present invention, which varies optical attenuation by changing the optical beam collimation;

FIG. 5 is a cross-sectional view of a VOA device of yet another embodiment of the present invention, which attenuates the light signal by introducing mode mismatch inside the waveguide;

FIG. 6 is an isometric view of a waveguide having a S-shaped core channel of another embodiment of the present invention;

FIG. 7 is an isometric view of a waveguide having a straight core channel of an alternative embodiment of the present invention;

FIG. 8 is a cross-sectional view of the waveguide of FIG. 6;

FIG. 9 is a cross-sectional view of the waveguide of FIG. 7; and

FIG. 10 is a graph showing simulation results for the amount of attenuation for a given applied voltage for the waveguides of FIGS. 6 and 7.

DETAILED DESCRIPTION

In the following description, numerous specific details are set forth to provide a more thorough description of the specific embodiments of the invention. It will be apparent, however, to one skilled in the art, that the invention may be practiced without all the specific details given below. In other instances, well known features have not been described in detail so as not to obscure the invention.

FIG. 2 is a cross-section of a portion of a slab waveguide of an embodiment of the present invention. The slab waveguide includes a core 214 surrounded by cladding material. In FIG. 2 the surrounding cladding material is depicted as top clad layer 212 and bottom clad layer 216. On top of and affixed to the top clad layer 212 is a top electrode 218. Below and affixed to the bottom clad layer 216 is a bottom electrode 220. A first voltage applied to top electrode 218 and a second voltage applied to bottom electrode 220 causes an electric field between the electrodes. A light signal 222 propagates through the core 214. When there is no electric field, the top clad layer 212 has refractive index n1; the core has refractive index n2; and the bottom clad layer 216 has refractive index n3. The refractive index of the core 214 is greater than the surrounding cladding material, i.e., n2>n1 and n2>n3. The core is made of an electro-optic (EO) material such as ferroelectric oxide, e.g., $LiNbO_3$, PZT, or PLZT, that changes its refractive index in the presence of an electric field. Hence by making one or both of the electrodes a certain shape, an electrically formed lens (or prism) is created when voltages are applied to the top and bottom electrodes, e.g., 218 and 220. In addition, any refractive index change of the top or bottom clad layers (212 and 216) in the presence of the electric field generated by voltages to electrodes 218 and 220 is less than the refractive index change in portion 214, allowing the slab to function as a waveguide in the presence of an electric field.

FIG. 3 is a top view of a variable optical attenuator (VOA) device 308 of an embodiment of the present invention, which varies optical attenuation by changing the optical beam deflection angle. In FIG. 3 the top view shows the cores of the waveguides, i.e., core channels 312 and 316 and the slab waveguide core 314. The lenses or prisms, e.g., 320, 322, 324, and 326, are located in the slab waveguide core 314. In one embodiment these lenses or prisms are formed from electric fields produced by electrodes above and below the slab waveguide core 314. In an alternative embodiment only prisms 322 and 324 are electrically formed, while lenses 320 and 326 are physical lenses. Channel waveguide 313 with core channel 312 is optically coupled to slab waveguide core 314. Slab waveguide core 314 is optically coupled to channel waveguide 315 with core channel 316. The VOA 308 has longitudinal axis 310 illustrated by a horizontal dotted line. Slab waveguide core 314 includes collimating lens 320, prism 322, prism 324, and focusing lens 326. The number, type, and location of the lenses and prisms may vary in other embodiments of the present invention to achieve optical attenuation.

A light signal 330 enters the VOA 308 at input port 331 and propagates through channel waveguide 313, slab waveguide 314, and channel waveguide 315 to output port 340. In channel waveguide 313 the light signal 330 travels through channel 312, and at channel the exit 332, the light signal 330 enters slab waveguide core 314. The diverging light signal is collimated by collimating lens 320 into light beam 333. Light beam 333 is deflected, i.e., the light beam's direction is changed, by prism 322 to give light beam 334. The amount of defection is dependent upon the strength of the electric field produced in the waveguide 314 by the electrodes (not shown) of electrically formed prism 322. The electrically formed prism 324 changes the direction of light beam 334 to be parallel to, but offset from longitudinal axis 310. Light beam 335 is then converged by focusing lens 326 to focal point 336, which located at or near the input 337 of core channel 316 of channel waveguide 315. The focused light beam 341 then proceeds as an attenuated light signal 338 to output port 340 via core channel 316.

When the voltages are off, prisms 322 and 324 are not formed, and the light beam 333 proceeds along the longitudinal axis 310 to lens 326, where the light beam 333 is focused to a focal point 336 located on the longitudinal axis 310. The amount of attenuation should be at a minimum for this case. By changing the amount of deflection of light signal 333 produced by prism 322, the focal point 336 moves up and down the normal to longitudinal axis 310, i.e., it is offset. The further the focal point is located away from the longitudinal axis 310, the greater the attenuation as less light enters channel 316. Thus the amount of light attenuation may be varied as a function of the electric field of prism 322, i.e., by the amount of defection of the light beam.

FIG. 4 is a top view of a VOA 408 of another embodiment of the present invention, which varies optical attenuation by changing the optical beam collimation. In FIG. 3 the top view shows the cores of the waveguides, i.e., core channels 412 and 416 and the slab waveguide core 414. The lenses, e.g., 420, 422, 424, and 426, are located in the slab waveguide core 414. In one embodiment these lenses are formed from electric fields produced by electrodes (not shown) above and below the slab waveguide core 414. In an alternative embodiment only lenses 422 and 424 are electrically formed, while lenses 420 and 426 are physical lenses. Channel waveguide 413 with core channel 412 is optically coupled to slab waveguide core 414. Channel waveguide 413, having channel 412, is optically coupled to slab waveguide core 414. Slab waveguide 414 is optically coupled to channel waveguide 415, having core channel 416. The VOA has longitudinal axis 410 illustrated by a horizontal dotted line. Slab waveguide core 414 includes collimating lens 420, diverging lens 422, collimating lens 424, and focusing lens 426. The number, type, and location of the lenses and prisms may vary in other embodiments of the present invention to achieve optical attenuation.

A light signal 430 enters the VOA 408 at input port 431 and propagates through channel waveguide core 412, slab waveguide core 414, and channel waveguide core 416 to output port 440. In channel waveguide core 414 the light signal 430 travels through core channel 412, and at channel exit 432 to channel 412, the light signal 430 diverges into slab waveguide core 414. The diverging light signal is collimated by collimating lens 420 into collimated light beam 433 with a width 450. Diverging lens 422 causes light beam 434 to spread out. The amount of divergence is dependent upon the strength of the electric field produced in the slab waveguide core 413 by the electrodes of diverging lens 422. The collimator lens 424 re-collimates light beam 434 to a light beam 435 with a width 452 of the re-collimated beam that is greater than the width 450 of the collimated light beam 433. Light beam 435 is then converged by focusing lens 426 to focal point 436 which is located along longitudinal axis 410 at or near the entrance 437 to channel 416 of channel waveguide 415. The focused light beam 441 then proceeds as attenuated light signal 438 to output port 440 via core channel 416 of channel waveguide 415. In an alternative embodiment the re-collimated beam width 452 is less than the width 450 of the collimated light beam 433.

When the voltages are off, lenses 422 and 424 are not formed, and the light beam 433 proceeds along the longitudinal axis 410 to lens 426 where the light beam 433 is focused to a focal point 436 located on the longitudinal axis 410 at or near channel entrance 437. The amount of attenuation is at a minimum for this case. By increasing the amount of divergence of light signal 433 produced by diverging lens 422, the collimation width 452 is increased, and the amount of light from focused light beam 441 that goes through entrance 437 is decreased. In other words, the amount of light attenuation is a function of the width 452 of the collimation of the light beam. In an alternative embodiment the focal point 436 may also be moved along longitudinal axis 410 by changing the electric field of focusing lens 436, hence changing the refractive index of lens 426 with respect to the refractive index of the slab waveguide core 414.

FIG. 5 is a cross-sectional view of a VOA 508 of yet another embodiment of the present invention, which attenuates the light signal by introducing mode mismatch inside the waveguide. The waveguide includes a top clad layer 510, a core 514, and a bottom clad layer 516. The top clad layer 510 includes a portion 512 having an electro-optic (EO) material, such as $LiNbO_3$, PZT, or PLZT. Positioned on top of and affixed to portion 512 of top clad layer 510 is a top electrode 520. Bottom electrode 522 is positioned below and affixed to bottom clad layer 516. The top 520 and bottom 522 electrodes, when there is a voltage applied, produces an electric field 524 (illustrated by the dotted arrows) in the waveguide. The electric field in portion 512 increases the refractive index of portion 512 to a higher refractive index value n4 (where n4>n1). The refractive indexes of the core 514 and bottom clad layer 516 remain the same or change less than that of portion 512, whether or not there is an electric field.

Changing the refractive index of the top clad layer 510 in portion 512, causes some light to pass out (or "leak out") of the waveguide. For example, the mode field diameter of a step-indexed fiber is a function of the core diameter, wavelength, and the refractive indexes of the core and clad. As the refractive indexes of the core and clad layers are brought closer together, for example by increasing the refractive index of portion 512, the mode field diameter gets larger, and the power propagating along core 514 decreases. Specifically, when the refractive index of the top clad layer 510 is increased by the electric field in portion 512, the beam power confined in the core 514 in the vicinity of portion 512 decreases. Some portion of the light passes from core 514 into portion 510, as represented by light ray 542, and the light propagating down core 514 is attenuated.

For example, light rays 530 and 532 are normally reflected at the core-clad interface as they propagate along core 514. With no electric filed, both rays will propagate to the other end of the core 514. When electric field 524 increases the refractive index of portion 512, ray 532 at the core-clad interface 540, is refracted out of the core 514 rather than being reflected (the top electrode 520, in this case, is transparent). The electric field effectively decreases the critical angle needed for total reflection, so light ray 532 is no longer reflected at interface 540. Light ray 530 continues to be totally internally reflected.

FIG. 6 shows a waveguide 610 having an S-shaped core channel 618 of another embodiment of the present invention. Waveguide 610 has top clad layer 612 having an EO material and a bottom clad layer 616 with a non-EO material. The core channel 618 has a non-EO material and is formed within the bottom clad layer 616 (see FIG. 9 for cross-sectional view). The core 618 has a curved shape, e.g., S-shape. In other embodiments the core 618 maybe straight or otherwise curved. The core 618 dimensions include the width 630 of the bottom clad layer 616 and the lateral shift 634 from the entrance 636 into core 618 to the exit 638 from core 618. A light signal 620 enters the core channel 618 at entrance 636 and propagates in the core channel 618 as light signal 622 until the channel exit 638. Electrodes (not shown) are positioned above top clad layer 612 and below bottom clad layer 616 to create an electric field in and around core channel 618. The electric field increases the index of refraction in the top clad layer and causes' a portion of the light signal 622 to leak out of the waveguide 610. In addition there is significant light leakage in the curved areas 640 and 642 of core 618, because the critical angles needed for total reflection of the beam can no longer be met due to the bends in the core. Thus light signal 624 is attenuated by controlling the electric field, i.e., the voltage on the electrodes.

FIG. 7 shows a waveguide 650 having a straight core channel 656 of another embodiment of the present invention. Waveguide 650 has top clad layer 652 having an EO material and a bottom clad layer 654 with a non-EO material. The core channel 656 has a non-EO material and is formed within the top clad layer 652 (see FIG. 8 for cross-sectional view). The core 656 has a non-curved shape, e.g., straight. In other embodiments, the core 656 has a curved shape, e.g., S-shape. A light signal 660 enters the core channel 656 at entrance 664 and propagates in the core channel 656 until the channel exit 666. Electrodes (not shown) are positioned above top clad layer 652 and below bottom clad layer 654 to create an electric field in and around core channel 656. The electric field increases the index of refraction in the top clad layer 652 and causes a portion of the light signal in core 656 to leak out of the waveguide 650. Thus light signal 662 is an attenuated version of light signal 660, where the attenuation is controlled by controlling the electric field, i.e., the voltage on the electrodes.

FIG. 8 is a cross-sectional view of the waveguide 650 of FIG. 7 along view line YY. The waveguide 710 includes top clad layer 712, core 714, and bottom clad layer 716. Top clad layer 712 comprises EO material. Core 714 is formed within top clad layer 712. The core 714 and bottom clad layer 716 have non-EO material. FIG. 8 shows a ridge type placement of the core 714 above the bottom clad layer 716.

FIG. 9 is a cross-sectional view of the waveguide 610 of FIG. 6 along view line XX. The waveguide 810 includes top clad layer 812, core 814, and bottom clad layer 816. Top clad layer 812 has EO material. The core 814 is formed within bottom clad layer 816. The core 814 and bottom clad layer 816 have non-EO material. FIG. 8 shows a buried type placement of the core 814 in the bottom clad layer 816.

A simulation was conducted using the waveguide 650 having the straight channel core with both ridge type (FIG. 8) and buried type (FIG. 9) cores. The simulation also used using the waveguide 610 having the S-channel core with both ridge type (FIG. 8) and buried type (FIG. 9) cores. The refractive index of the bottom clad was about 1.563. The refractive index of the core was about 1.567. The refractive index of the top clad (with the EO material having electro-optic coefficient of 100 picometers per volt) was about 1.563. For FIG. 6 the width 630 (and 632) was about 4 mm and the lateral shift 634 about 0.125 mm. The core had a 7.times.7 µm cross-section.

FIG. 10 is a graph showing the results of a simulation for the amount of attenuation for a given applied voltage for the waveguides of FIGS. 6 and 7. The y-axis 912 gives the attenuation in dB (power) per cm and the x-axis 910 gives voltage applied across the electrodes in volts per 10 µm. The EO coefficient is 100 pm/volt. Curves 920 and 922 show the attenuation for a curved core such as in FIG. 6, and curves 924 and 926 show attenuation for a straight core such as in FIG. 7. Curves 920 and 924 are for the ridge type core of FIG. 8. Curves 922 and 926 are for the buried type core of FIG. 9. From curves 920 and 922, the S-shaped core channel of FIG. 6 gives a wider dynamic range, e.g., >15 dB, when compared to the straight channel core of FIG. 7. However, the straight core channel (curves 924 and 926) does allow finer control of the attenuation.

The specification and drawings are to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A variable optical attenuator for attenuating a light signal comprising:
    an input port for receiving said light signal;
    an output port for output of said attenuated light signal;
    a slab waveguide for propagating said light signal from said input port to said output port, said slab waveguide comprising a core, a top clad layer, and a bottom clad layer, wherein at least a part of said top clad layer comprises an electro-optic material; and
    a top electrode positioned on said top clad layer for creating an electric field, said top electrode being configured such that when an electric field is created, the refractive index of a portion of said top clad layer is changed such that when the electric field is created a part of said light signal is emitted out of said waveguide through a clad layer before reaching said output port.

2. The variable optical attenuator of claim 1 wherein said bottom clad layer comprises a material whose refractive index is unchanged when said electric field is present.

3. The variable optical attenuator of claim 1 further comprising a bottom electrode affixed to said bottom clad layer.

4. The variable optical attenuator of claim 1 wherein when there is no electric field said core has a higher refractive index than said top clad layer.

* * * * *